United States Patent [19]
Toffolo et al.

[11] Patent Number: 5,757,268
[45] Date of Patent: May 26, 1998

[54] PRIORITIZATION OF VEHICLE DISPLAY FEATURES

[75] Inventors: Daniel Toffolo, Dearborn, Mich.; William Rogers, Soffield, Conn.; Silviu Palalau, Birmingham, Mich.

[73] Assignee: United Technologies Automotive, Inc., Dearborn, Mich.

[21] Appl. No.: 722,860

[22] Filed: Sep. 26, 1996

[51] Int. Cl.$^6$ ............................................. B60Q 1/00
[52] U.S. Cl. .................... 340/461; 340/459; 340/525; 345/115; 345/129; 345/127; 345/131
[58] Field of Search ........................ 340/461, 459, 340/525, 905; 345/115, 116, 129, 130, 127, 131; 395/344

[56] References Cited

U.S. PATENT DOCUMENTS

| | | |
|---|---|---|
| 5,006,829 | 4/1991 | Miyamoto .................. 340/459 |
| 5,121,112 | 6/1992 | Nakadozono ................ 340/870.16 |
| 5,313,200 | 5/1994 | Sone ......................... 340/905 |
| 5,327,117 | 7/1994 | Kohsaka ..................... 340/525 |
| 5,386,218 | 1/1995 | Yano et al. ................. 345/129 |

*Primary Examiner*—Jeffery Hofsass
*Assistant Examiner*—Julie B. Lieu
*Attorney, Agent, or Firm*—Howard & Howard

[57] ABSTRACT

A method and apparatus for controlling information to be displayed on a vehicle reconfigurable display includes the steps of prioritizing information. The control identifies each of the items which are desirably displayed and determines the space necessary to display all of those items. If the necessary space exceeds available space, then the control goes through a routine wherein it attempts to minimize the size of the display items, and prioritize the display items. Certain items must always be displayed, whereas other items need only be optionally displayed. The control may identify certain optional items as not to be displayed under certain circumstances. Further, the control may select between available sizes for other items to provide additional space.

12 Claims, 5 Drawing Sheets

PRIORITIZATION OF VEHICLE DISPLAY FEATURES

BACKGROUND OF THE INVENTION

This invention relates to a reconfigurable information display for a vehicle wherein information items to be displayed are assigned priority, and displayed based upon the priority and available space.

Vehicles typically utilize fixed instrument panel displays. In a fixed instrument panel display, the items to be displayed to the operator such as speed, fuel, etc., are provided on gauges at fixed locations on the instrument panel. Thus, the operator is able to look at a particular location on the instrument panel and receive the necessary information.

More and more information is being displayed to an operator of a modern vehicle. As an example, trip direction systems are being incorporated into vehicles, in which a reconfigurable display panel provides an operator with directions to a particular location. These systems operate in conjunction with satellite-based location identification systems. It has been proposed recently to utilize reconfigurable displays for the entire instrument panel. As one example, co-pending patent application Ser. No. 08/650,038 discloses such a system.

Challenges are presented when utilizing a reconfigurable display panel for vehicle information display. One particular challenge is determining which information is to be displayed, and the location for the displayed information. The operator must always be provided with certain high priority information, such as vehicle speed. In addition, high priority information is desirably provided at a relatively fixed location. That is, if the operator is accustomed to looking to the left hand side of the display to view the information, it would be most desirable that at least the high priority information is displayed in that location.

Problems are presented by the increasing amount of information that is to be displayed. Further, changes in the information to be displayed, such as displaying an operating parameter an operator is adjusting, or displaying warning lights that may come on occasionally, also present problems to the accommodation of all of the information that must be displayed.

SUMMARY OF THE INVENTION

The disclosed invention includes a method and apparatus for prioritizing information that is to be displayed on a reconfigurable display panel. Once the information has been prioritized, a control evaluates available display area, and determines which information is to be displayed, and which information will not be displayed. High priority, or necessary information, is displayed, while optional information may or may not be displayed. Further, the operator is provided with the ability to select preferences on the appearance of the display. If the operator has selected a preference to a larger display, that preference may be overridden if additional space is necessary.

In one embodiment of this invention, a display control receives signals from operator switches, vehicle sensors, and may also receive signals from a transmitter for traffic information. Such transmitters are a known part of available trip direction systems. Known traffic information transmitters may send signals to the vehicle trip direction system such as an indication of the location of a traffic jam, or areas that should be avoided. In the event that the vehicle control receives such a signal, and the operator is utilizing the map function, the system may need to override the previous calculated route and display a new route. Other inputs may also be utilized in certain application, and the system would still be within the scope of this application.

In preferred embodiments of this invention, each item to be displayed is assigned a priority value in a table accessible to the control. At least some display items preferably allow an operator display preference. As one example, the operator may select a dial display for the speed, rather than a numeric display. Each item to be displayed is also assigned a minimum display size, although other optional sizes may be available. As an example, the speed display may be provided at two different sizes with a larger size displayed when space is available and the smaller size displayed if space is not available.

Each display item is also preferably grouped with other similar items. It may be desirable to keep all operational information at a particular area of the display. Also information such as entertainment system, (e.g., radio) may preferably be maintained at a particular area. Similarly, information with regard to the climate control may also be grouped together.

The information groups may be provided with a desired location in some cases. In particular, it may be desirable to maintain the operational information at a particular location on the display panel, as an example, on the left side of the display panel. Less critical information groups may not be provided with a desired location. In one embodiment there is a second display spaced from the main display and between the passenger and driver seats of the vehicle. The second display may display information which is preferably made easily accessible to the passenger. As an example, the operator may select a preference to have trip direction information displayed on this second screen such that the passenger may assist the driver in reaching a desired destination. Alternatively, the second display may be used for items deemed to be of lesser importance than those displayed on the main display. Further, operator switches could be associated with the second display.

Finally, each item is preferably assigned a necessary or optional indication. As an example, speed display is indicated as necessary, since speed must be displayed. Other information may have a lower priority. Vehicle radio information may be generally optional. However, if the operator is adjusting a radio parameter, then the priority of the parameter being adjusted may move upward relative to other less necessary information.

One main feature of this invention is prioritizing items to be displayed. Examples will be disclosed, but there are many other options available that are within the scope of this invention.

The method can be best understood by evaluating a change in the information to be displayed. Assume that a first group of information items are being displayed. Now a change will be explained. The system receives a signal indicating a desired change in the display. This signal could be from traffic advisory transmitter, from an operator switch, or from vehicle sensors. As one example, if a vehicle sensor indicates that the fuel level is running dangerously low, the display control may receive a signal that a low fuel warning display is necessary. Typically, a low fuel warning may be provided with a very high priority. The system then effects the command to display a low fuel warning. A memory list of items to be displayed is adjusted to include the low fuel warning, which is provided with a relatively high prioritization. The control then recalculates the size and position for each item to be displayed. The group and preferred location identified with each item operate to assist in selecting the desired location for each item.

In an initial iteration, the preferred sizes for each item are utilized to calculate a desired display. The control then compares the required area for the desired display with the available space. If there is not room for all desired display, then the control begins to re-evaluate the desired display. A first preferred step is to minimize any display which has an alternative smaller size. As an example, if there are several available sizes for the speed display, the control may select a smaller size, then recalculate the necessary size for the total desired display to determine whether this one change provides the necessary space. This reduction process continues until all items to be displayed fit on the display panel, or until there are no other display items which can be reduced in size.

If there is still not enough available size, the display items are re-evaluated based on the need to be displayed. A display item that is necessary is displayed. An item that is optional moves into a next evaluation step. The next preferred step in determining which items are to be displayed is to give priority to the most recently actuated of the optional display items. As an example, if the operator had recently adjusted the radio setting, but had not recently adjusted the climate settings, then the radio settings may be given a high priority relative to climate displays. Further, it may be that displays of items that have been adjusted are removed from the list of items to be displayed after a determined period of time to provide additional space.

In this case, if the control determines that one of the display items cannot be displayed due to lack of space then the higher priority of the radio may cause it to remain displayed, while climate information is not displayed.

In addition, in a preferred embodiment, a second display screen is placed to the right of the driver, and at a location between the driver and passenger. Items which cannot be displayed on the main display may be moved to the second display. Once the entire arrangement of the main display (and second display, if used) has been calculated, the system then displays the desired image. The control is provided with appropriate software to make the above determinations and calculations. Although one example is set forth in this application, it should be understood that many other reconfigurations of the information are within the scope of this invention. The examples set forth in this application are meant only to indicate the power and function of the system, and not to exhaust all of its possible embodiments.

The control may also be designed such that it can accept aftermarket type items to be displayed. As an example, cellular phones may be added to the vehicle, as may be other systems such as CD players. The control may be initially designed such that it is able to accept those signals and display appropriate displays in response to signals from those aftermarket systems. Alternatively, the added system may communicate with the control to "teach" the control how the added system should be displayed. To achieve this it may be that the added system and control both communicate with the vehicle data bus line.

These and other features of the present invention can be best understood from the following specification and drawings, of which the following is a brief description.

DETAILED DESCRIPTION OF PREFERRED EMBODIMENT

Figure 1A:
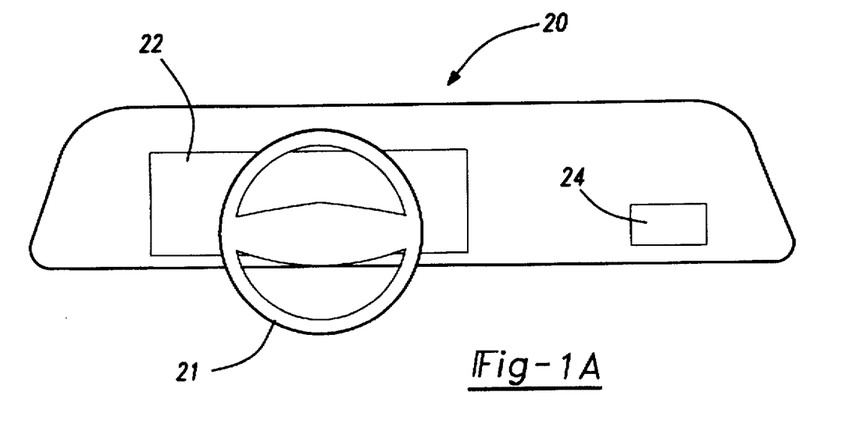
FIG. 1A shows a display system to be used in a vehicle.

FIG. 1A shows a vehicle display system 20, which includes a main display 22 to be positioned in front of the driver and steering wheel 21. A second display 24 may be positioned to the right of the driver, and between the driver and the passenger.

Figure 1B:
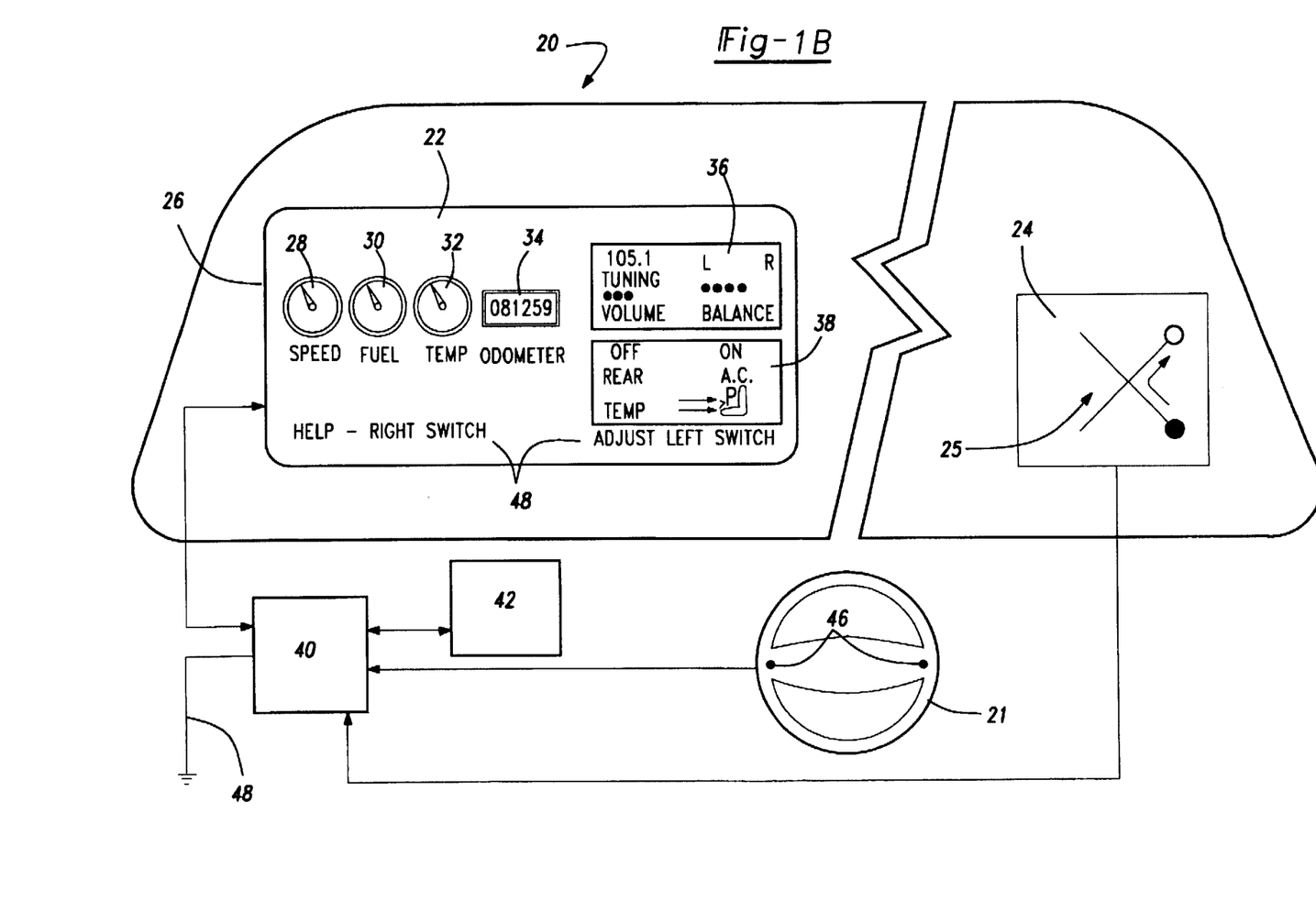
FIG. 1B is a schematic view of an operator display system utilizing a reconfigurable panel.

As shown in FIG. 1B, the second display 24 has a map or direction function 25 displayed. The map function itself forms no portion of this invention, however, the system of this invention does provide certain display options in the type of map information that may be displayed.

The main display 22 may include an operational grouping 26 that would includes operational information items, such as speed 28, fuel level 30, engine temperature 32, and the odometer 34. It is preferred that this operational grouping be maintained near a set location on the display panel 22, typically, near the left of the display panel. In this way, an operator seeking to determine the present speed knows the approximate location to look for speed dial 28.

A second grouping 36 is for entertainment information. As an example, if the operator is listening to the radio, the radio tuning, volume and balance may be displayed. Further, a climate grouping 38 may also be displayed. The climate grouping may indicate information items such as whether the rear defroster is on or off, whether air conditioning is on or off, a desired temperature and the presently selected air direction.

A control 40 selects the items to be displayed on panels 22 and 24. Reconfigurable display panels (LCD, LED, EL or other such panels) and the controls to drive those panels are widely available. The necessary controls are within the skill of a worker of ordinary skill in the art. The present invention is directed to certain control features for controlling the information displayed on the panels 22 and 24.

Control 40 is provided with several inputs. A first input 42 is shown schematically, and includes vehicle sensor information, such as speed, fuel level, and other information that may result in a display function. Further, sensors may provide an indication to the control 40 that a particular warning sign should be displayed. Again, the particular sensors are known within the art. It is the use of control 40 to modify how the information is displayed that is inventive.

The operator is provided with a switching system that allows inputting of desired information to be displayed. An operator control switch system 44 is shown as switches 46 mounted on a steering wheel. The U.S. patent application Ser. No. 08/650,038 discloses a system allowing an operator to utilize switches to adjust vehicle functions. Those functions are displayed on a reconfigurable display panel as they are being adjusted. Thus, as an example, the operator is provided with the ability to adjust radio tuning, and the tuning is displayed as it is adjusted. Further, some communication between these operator switches and the systems which are being adjusted is also provided. The details of this communication are as known in the art.

Further, an antenna 48 may receive information such as a traffic advisory signal that is provided to users of trip direction systems that display directions such as map 25. This traffic advisory signal information is known, and provides indications such as the location of a traffic jam. The trip direction function is then reset to avoid that traffic jam.

In addition, information 48 may be provided on screen 22 giving information to the operator as to how to adjust a display. As an example, a help prompt may allow the operator to request instruction on how to adjust certain vehicle parameters. The system also may provide an instruction on how to begin to adjust or set display information. As shown, the displayed information indicates that to adjust, the operator should actuate the left switch 46. Of course, any other combination of switch actuation is within the scope of this invention.

Figure 2A:
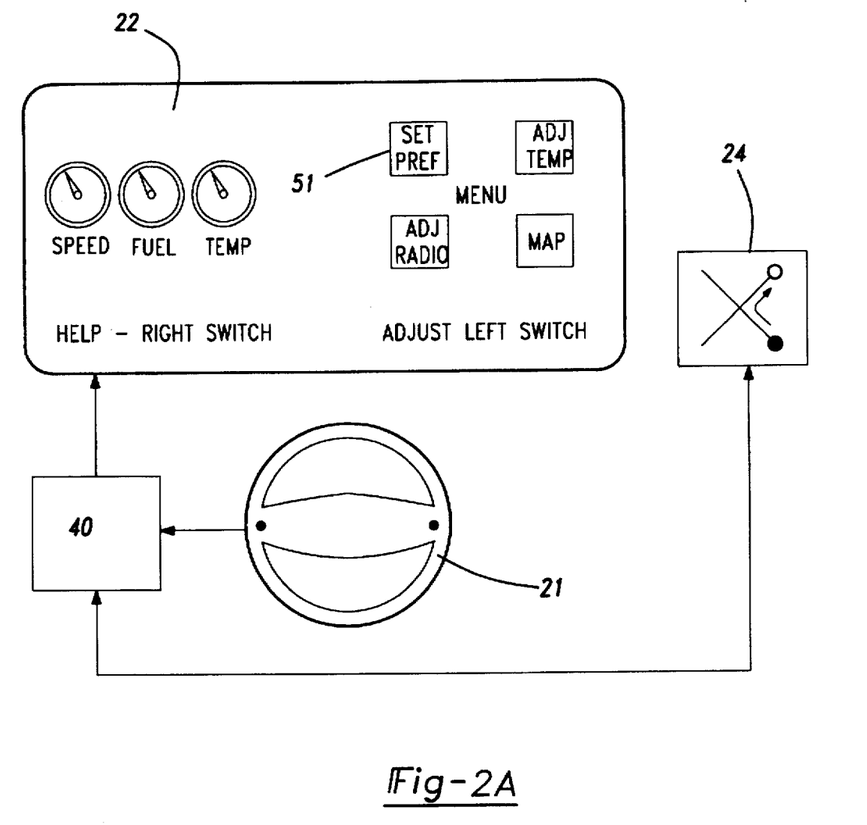
FIG. 2A shows the system of FIG. 1 in an application providing options to an operator.

FIG. 2A shows an example display on panel 22 after the operator has requested adjustment. The display may bring up a menu which provides the available options to the operator. The menu may allow the operator to select adjustment of climate or entertainment feature, request map display, or set preferences for the display. Some indication from the operator would be provided through the switches to select a particular one of the available options. As an example, an arrow icon 51 is shown aligned with set preference. In one control logic, one of the two switches 46 moves icon 51, while the other is an enter button. Thus, the operator moves the icon 51 to the desired menu item and then actuates the enter switch. These details are only one example, and other logics are within the scope of this invention.

Figure 2B:
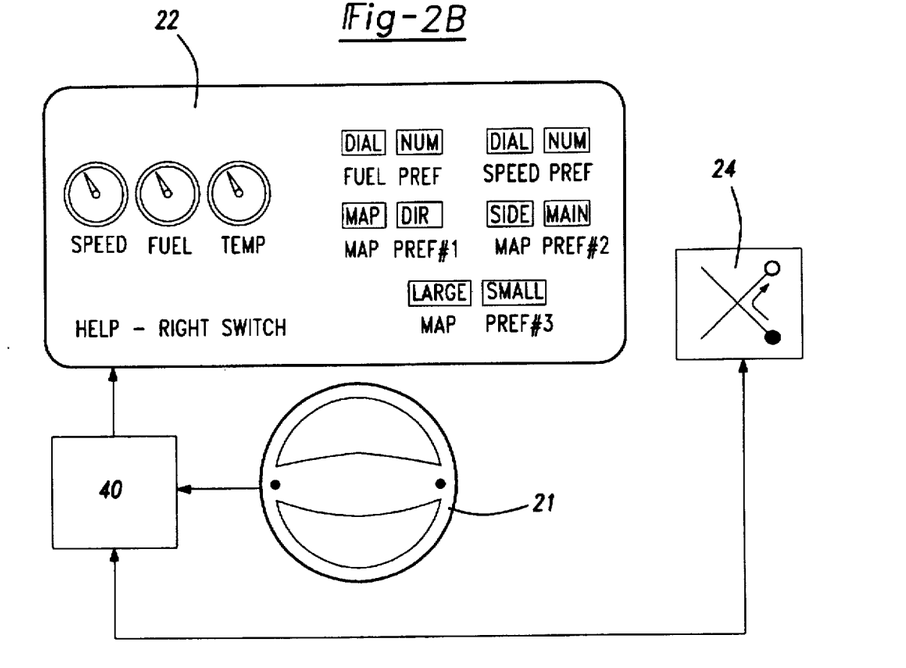
FIG. 2B shows a subsequent adjustment step from that shown in FIG. 2A.

FIG. 2B shows a display after the operator has selected a "set preference". The display preferences available to the operator are displayed. Of course, the original menu of FIG. 2A could be more detailed and ask the operator to identify which system the preferences are to be set for. In the display shown in FIG. 2B, the operator is provided with five potential preferences to be set. The operator is provided as an example with the ability to select a dial or numeric speed display. A similar preference may be provided for the fuel level. Thus, an operator may desire to have the speed displayed as a dial, such as shown in FIG. 1. The operator is then able to set that preference. Further, the operator may be provided with preferences relative to the map display. As an example, it may be that the operator is provided with a map preference 1 allowing the operator to select either a map, or simple language directions. The operator may also be provided with a map preference as to the size of the map relative to the display 22. The operator may be able to request that the map extend over the majority of the display 22, or that it only be provided in a particular area on the display 22. Further, the operator may be provided with the preference of selecting the location of the map between displays 22 and 24. As an example, as shown in FIG. 1, map 25 is displayed on panel 24. A preference choice may allow the operator to request that display location.

The particular number of preferences and the particular type of preferences are by no means exhausted with the above description. The above list is meant as an example of the type of preferences that may be provided in the inventive system.

Figures 3, 4:
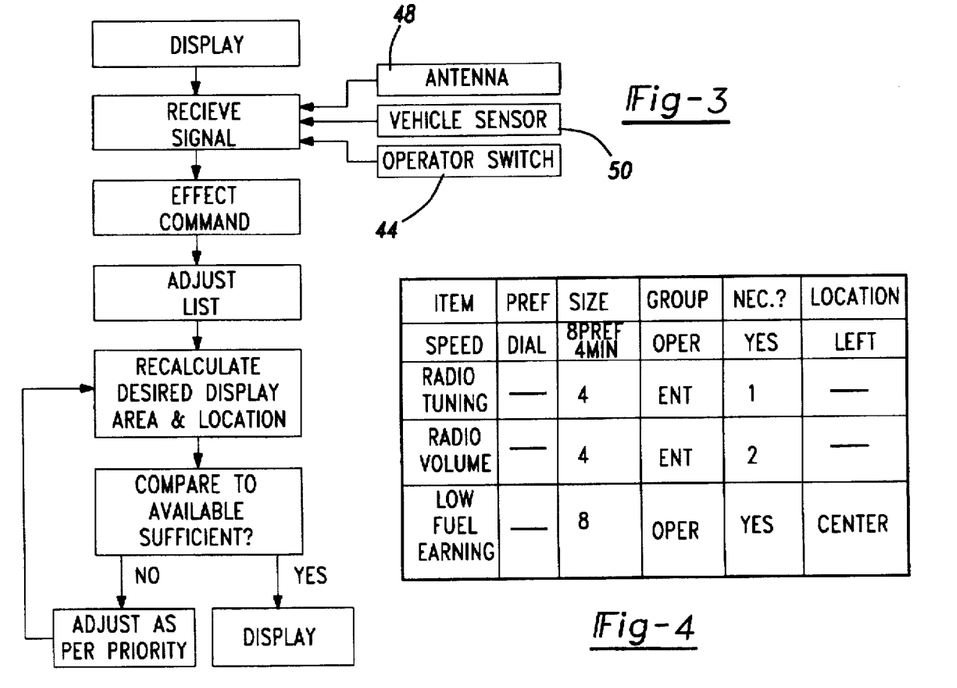
FIG. 3 is a flowchart of the control process for the present invention.
FIG. 4 shows a portion of a control table for prioritizing information items to be displayed.

FIG. 3 is a flowchart for the operation of the control 40. The display is initially displaying a set of information items. Now, an input signal is received from antenna 48, from the vehicle control sensors 42, or from the operator switch system 44. The input signal goes to the control 40, and control 40 begins to effect the command from the input signal. The control 40 may also be connected into the vehicle systems to effect adjustment on those systems. Again, the details of this control are as known in the art. A first preferred step is to adjust a listing of items to be displayed to include the information desired by the input signal. The control then recalculates a desired display location and display area. The control then takes the desired display area and location and compares it to the available area. If there is sufficient space, then control 40 displays the new display. If the available area is smaller than the desired area, then the control must begin to reconfigure its desired display. Several steps may be included in this adjustment.

As one preferred first step, when desired display area is too great, the control first goes through a listing of information items which have different available display sizes. The control will then reduce those items to a smaller size, and recalculate the total desired display size with the reduction. The control may review the list of available items that may be reduced and select ones to optimize the provision of necessary space. As an example, if the reduction of one item would provide ten additional space units, but only three additional space units are necessary, the control may optimize the reduction by selecting to reduce a second item, the reduction of which would provide four additional space items.

If by reducing items, the available area equals or exceeds the desired area, then the system then moves to the display step. Examples of smaller sizes may be moving a dial speedometer to a smaller numeric display. The control continues to move to smaller sizes and recalculates the desired area until either all desired display items are accommodated, or there are no more display items having a smaller available size. If there is still insufficient available area, the system begins to sort the items to be displayed. The first priority is to look at the need of the item to be displayed. This may be a true/false field, or could be a numeric setting for the particular display item. As an example, it may be that the speedometer information must be displayed. Other information may be identified as optional. Alternatively, the information which is more "optional" could be provided with a numeric prioritization such that it can be evaluated relative to other optional information.

Other options considered in evaluating the prioritization of the items to be displayed are how recently the item was requested by the operator. As an example, if the operator has recently changed a radio setting, but has not as recently changed a climate setting, then radio setting may be given priority over climate setting in evaluating which items are displayed, and which items are not displayed. Further, the control may determine that some optional information is not to be displayed on the main display 22, but is to be moved to the second display 24. Thus, should the system determine that a particular application does not allow room for climate information on the main display 22, the climate information may be moved to the second display 24.

Other desired features in determining the desired location of the information include grouping of information. As an example, it is desirable to maintain all operational information in a particular location. Further, it is desired to maintain the radio and climate information in groups. Further, other items to be displayed are preferably grouped into logically associated groups. As discussed above, it may be desirable to have the groupings in known locations and thus they may also have desired locations.

An example table or list is shown in FIG. 4 for prioritizing four pieces of information to be displayed. First, the speed information is shown as including a operator preference for a dial display. The size associated with the speed is shown as having two sizes, with a first larger size associated with a dial display indicated by the numeral 8 and a small display size associated with a numeric display indicated by numeral 4. It should be understood that the numbers assigned to the size do not necessarily correspond directly to any particular unit. They are merely placed here for providing an understanding of the operational steps. The speed is also provided with a grouping, and is associated with other items to be displayed in its grouping. The grouping here is shown as operational information. There is also information on whether speed is a necessary display. Speed is necessary. The table further includes a desired location for the speed, shown here as far left on the display panel.

Two information items from the entertainment grouping are also shown in the table. Radio tuning and radio volume are shown as not being provided with any preference for the operator, or any particular desired location. Of course, the operator may be provided in some systems with preference on these items and there may also be a desired location. However, not all items necessarily are provided with operator preferences, or with desired locations. The minimum size is shown as 4 and the grouping is shown as entertainment. The necessity of the two radio parameters is not equal to that of the speed display. Speed display must always be displayed, where as radio information is optional. Thus, in some embodiments of this invention, the necessity may simply be a "no". However, in the system shown in FIG. 4, there is also a prioritization within the optional display items. Radio tuning is shown as a 1, wherein radio volume is shown as a 2. The higher prioritization of the tuning may be provided if the tuning had been recently adjusted by the operator. That is, if the operator has recently adjusted the tuning, it may be provided with a higher prioritization than volume.

Further, table 4 shows a low fuel warning. The system may be provided with information from its sensors that the vehicle is low on fuel, as an example. The low fuel warning is shown as not having any operator preference in its display, and having minimum size of 8. The grouping is operational, and the display is shown as necessary. If the low fuel warning is being sent to the control, it may be that the designer wishes that low fuel warning to always be displayed. Of course, if there is no low fuel warning signal sent to the control, then there would be no low fuel item in the display table, and it would not be displayed. The item is added to the table when the signal is received. The low fuel warning is shown as having a desired location.

FIGS. 5–8 will display some options. These are not shown as being exhaustive of the type of situations that may be encountered, but rather to show certain examples from which the overall display system can be better appreciated.

Figure 5:
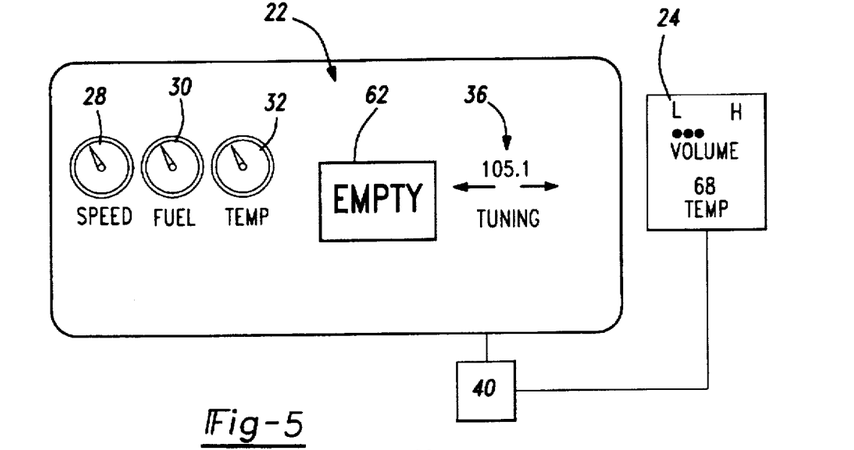
FIG. 5 shows one possible display application.

As shown in FIG. 5, a display panel 22 is provided with operational information 28, 30 and 32 to the left, and as dials. The dials are relatively large when compared to the digital or numeric information that could alternatively be provided.

A low fuel warning 62 is shown in the approximate center of the display. The control 40 has determined that the warning 62 must be displayed, and that information 28, 30 and 32 should also be displayed.

In the situation shown in FIG. 5, the operator has indicated a desire to adjust the tuning on the radio. This may be provided by selectively adjusting the switches 46, and through a menu such as shown in FIG. 2A. Details of one potential system for achieving adjustment are disclosed in co-pending patent application Ser. No. 08/650,038. The present invention relates to the display criteria utilized when one is adjusting information.

When one desires to adjust the tuning, a display such as shown in FIG. 5 is provided. The display shows the present radio station, and shows icons indicating that the station may be adjusted upwardly or downwardly. When the operator has requested that the tuning be adjusted, tuning would have a relatively high priority compared to other radio information. Thus, although little available space is left on the panel 22, due to the low warning light, radio tuning information is displayed to allow the operator to adjust that information. As shown, the control has gone through its logic and determined that radio volume, and climate information do not have high enough priority such that they should be displayed on the panel 22. Those two information items are displayed on the second panel 24.

As discussed above, as one potential step before moving the information to the second panel 24, the control 40 may first reduce the size of the displays 28, 30 and 32. However, in the logic shown in FIG. 5, the information shown on panel 24 does not have high enough priority that the control 40 would reduce the size of the information 28, 30 and 32 in the present situation. The exact details on these types of selections can take several permeatations, and the present invention is not limited to any one particular choice.

Figure 6:
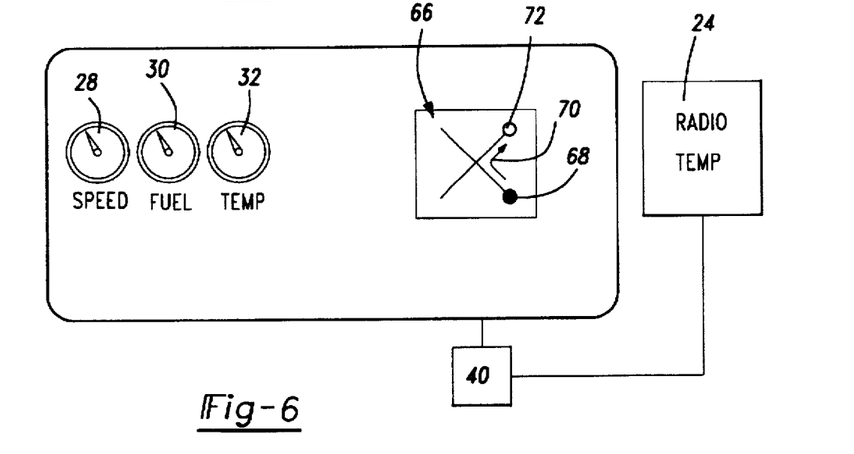
FIG. 6 shows another display application.

FIG. 6, shows the display of map information 66 on the display panel 22. As shown, the map information 66 is relatively large, and combined with the dials 28, 30 and 32, this information has caused the entertainment and climate information to be moved to the second panel 24. Map information 26 includes a location 68, directions 70, and a destination 72. The direction 70 may be in the form of arrows, or may be in the form of written information. As set forth above, in some maps systems, the operator may be provided with the option of selecting whether word directions would substitute for the map. Further, the operator is provided with the preference of selecting a large map which would cover more of the screen 22, or a smaller map such as shown in FIG. 6.

Figure 7A:
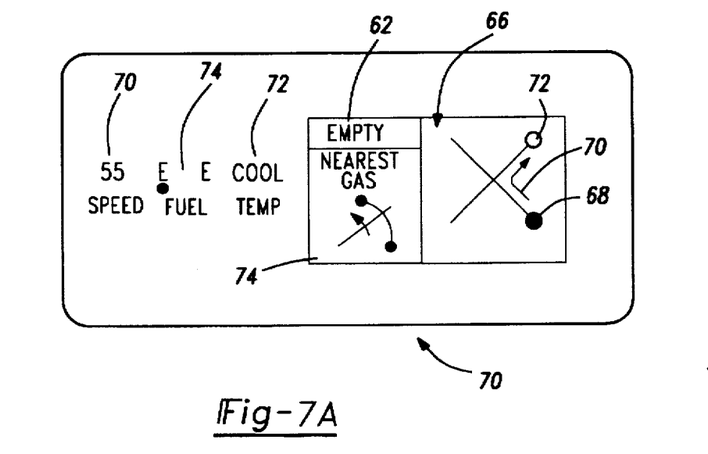
FIG. 7A shows yet another display situation.

FIG. 7A now shows one of the types of selection that control 40 may utilize in a particular situation. As shown, the panel 22 continues to display the map information 66. However, the control 40 has now received information that the fuel level is dangerously low and a low fuel warning 62 is to be displayed. Further, it may be that the map system is provided with the sophistication such that it can show directions to the nearest gas stations as a sub-map. It may be desirable to display this fuel information when the low fuel warning signal 62 is actuated. Between FIGS. 6 and 7A, the control has determined that the displayed information 62, 66 and 74 are all of sufficient priority that they should be displayed. Thus, the dial 28, 30 and 32 have all been reduced to numeric or digital information. This provides additional display space on the panel 22. Again, the control has gone through the process of initially preferring that the dial be utilized. However, in calculating the available space, the control has gone through several iterations and has moved the displays 70, 72 and 74 to their smaller digital or numeric information to provide additional space for the new items 62 and 74 that the control has determined should be displayed.

Figure 7B:
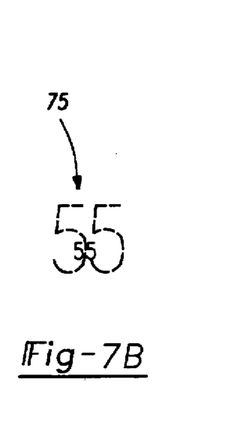
FIG. 7B shows one further modification from the system shown in FIG. 7A.

FIG. 7B shows one further space saving option. As shown in FIG. 7B, the numeric speed information 75 may also be moved to a smaller display size. The larger display size is shown in dotted line, while a smaller display size is shown in solid line. While this may provide additional space in certain applications, in all applications there should be a minimum size for the most important information to be displayed, such as speed. It would typically not be desirable to reduce the speed information such that it is difficult for the operator to easily see the information.

Figure 8A:
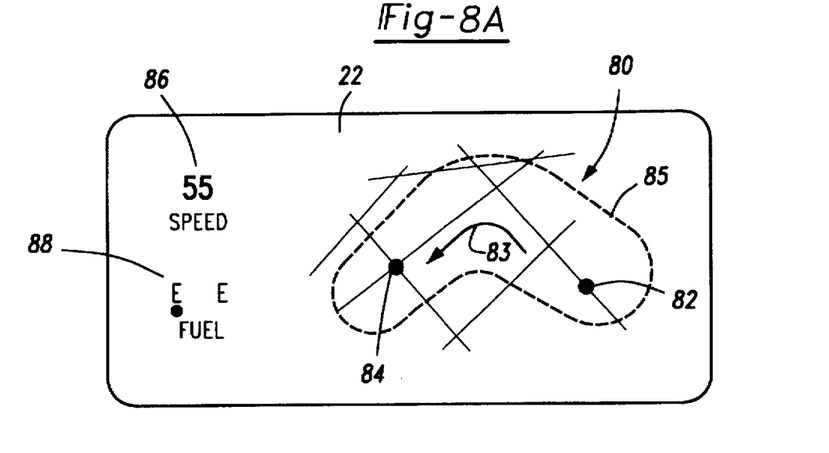
FIG. 8A shows yet another feature.
Figure 8B:
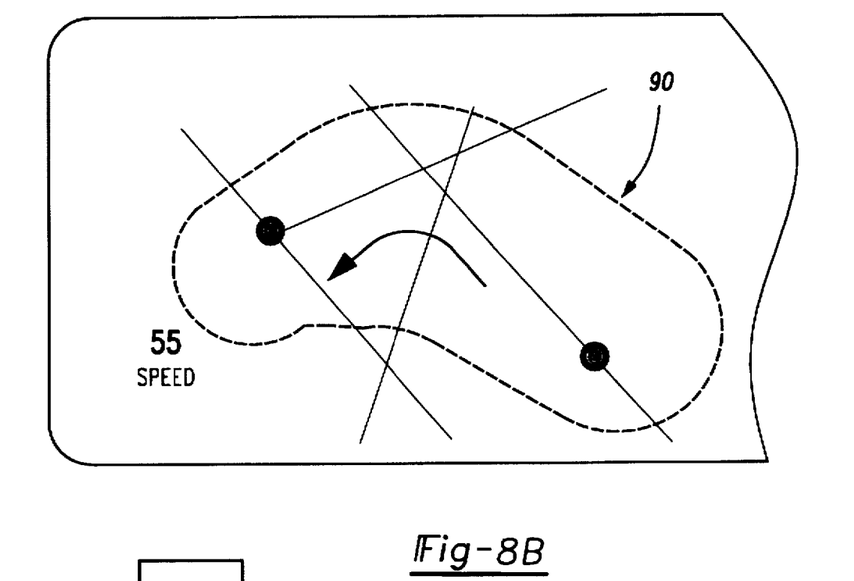
FIG. 8B shows a modification of the FIG. 8A system.

FIG. 8A shows one further feature of the display logic. As shown in FIG. 8, display panel 22 is now displaying map information 80. The operator has selected the map information to be large and extend over the majority of this screen 22. The map information shows the vehicle location 82, directions 83, and a destination 84. The dotted line 85 is not displayed, and could be described as the envelope of the information to be displayed between the location and the destination. The other items which are to be displayed, here shown as speed 86, and fuel 88 are preferably placed outside of the envelope 85. Thus, the designer may program control 40 to provide location preference for items which are to be displayed in combination with the map 80 such that the location of the envelope 85 is utilized. Most preferably, the information 86 and 88 is displayed outwardly of the envelope. While the situation shown in FIG. 8A allows this to be achieved easily, in certain applications the destination may be further to the left. In such a situation, the control 40 may move the location of the displayed items 86 and 88 to another location. As an example, in FIG. 8B, the destination is shown in the upper left hand corner such that the routing envelope 90 would include the area where the items 86 and 88 are shown in the display of FIG. 8A. In this situation, the speed may be moved downwardly such that it is outside of the envelope 90. Of course, the designer of the control algorithm for control 40 would balance the desire to not have information displayed within envelope 90 against the desire to have important information in a set location.

Figure 9:
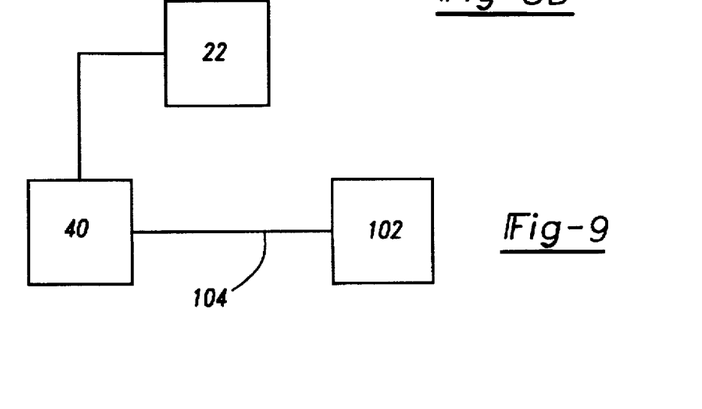
FIG. 9 shows one further feature.

In the FIG. 9 embodiment, the added item is CD player 102. The CD player 102 communicates to a data bus line 104. The control 40 communicates with the CD player 102 through the data bus line 104. Thus, when the operator adds the CD player 102, the control 40 begins to drive display items on display panel 22 from the CD player 102. In addition, the operator switches may be used to control the CD player 102, as with the above-discussed embodiments. The control 40 may interact with the newly added CD player in one of two ways. First, the control 40 could be designed to anticipate the possibility of a CD player being added to the system. Thus, the control 40 could include appropriate circuitry to recognize and accept the required signals for the CD player 102. Preferably, however, the CD player 102 is structured such that it teaches the control 40 its necessary displays and its operating parameters through the bus line 104. The controls and necessary steps to achieve this goal are within the skill of a worker in the art. It is the application which is inventive.

This feature is particularly beneficial given the inventive prioritization. With the addition of further add-on systems, the necessary displays become difficult to predict to the initial OEM designer of the display panel. Thus, by allowing the control to be modified with additional add-on items, the panel can keep up-to-date with the vehicle. Moreover, as additional items are added, the prioritization which is the main feature of this invention becomes even more important.

In one preferred application, the control 40 is software based to achieve the above-listed control functions. Of course, it may be possible in some applications to utilize other types controls such as circuit chips, etc., to achieve the control logic.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A method of displaying information in a vehicle, comprising the steps of:
   1) identifying a group of items to be displayed and providing an operator with the ability to set preferences in the appearance of at least one of said items to be displayed;
   2) setting a priority for each of said items;
   3) receiving a signal directing that said group of items be modified;
   4) determining a desired display based upon said signal;
   5) comparing the required area for said desired display to the available display area; and
   6) reconfiguring said desired display based upon the prioritization if said desired display area is greater than said available display area including over-riding said operator preferences if said preferentially selected item is larger than other optional displays for the same information.

2. A method as recited in claim 1, wherein certain display items are prioritized to always be displayed.

3. A method as recited in claim 1, wherein certain information may be moved to a second screen if sufficient space is not available.

4. A method as recited in claim 1, wherein the adjustment of step 6) includes reviewing said items to be displayed and selecting alternative smaller display options for the same item to reduce the required area for said desired display, and repeating this reduction until the comparison of step 5) results in the area for said desired display not exceeding said available display area, or until all items to be displayed have already been moved to a smallest available size.

5. A method as recited in claim 1, wherein an additional system is added to the vehicle and communicates with a control for display, said additional system providing signals to said control to add display items from said additional system to said group of items.

6. An instrument panel display system for a vehicle, comprising:
   a reconfigurable display panel that displays a plurality of images, wherein some of said images are necessary instrument images indicative of necessary vehicle information that are always displayed on said display panel and others of said images are user-selected optional images indicative of operational status of vehicle accessories and wherein at least one of said optional images has a user-preferred configuration and size and at least one other possible configuration and size that is different than said user-preferred configuration and size;
   at least one operator input switch that allows an operator of the system within the vehicle to select one or more of said optional images to be displayed with said necessary instrument images on said panel; and a controller that controls the display on said display panel by always causing said necessary instrument images to be displayed and prioritizing a display of selected ones of said optional images selected by the system operator, said control prioritizing said display by comparing a size of the user preferred configuration and size of each selected optional image to an available space on said display panel and determining whether all selected optional images will fit within said available space and automatically changing the size or configuration of at least one of said selected optional images from said user-preferred size or configuration such that all selected optional images will fit within said available space, said control causing said images to be displayed on said display panel when said images will fit within said available space.

7. The system of claim 6, further comprising an antenna associated with the vehicle that provides information to said control and wherein said control causes incoming images to be displayed on said display panel that are indicative of said information received by said antenna and wherein said incoming images are optional images.

8. The system of claim 6, wherein said display includes a main panel positioned approximately forwardly of a driver of the vehicle and a second panel to be spaced from the driver and toward a passenger seat in the vehicle and wherein said necessary images are always displayed on said main panel.

9. The system of claim 6, wherein at least one of said images indicates information that is selectably adjustable by the operator and wherein the control causes said at least one image to display an adjustment to said information as said information is adjusted by the operator.

10. The system of claim 6, wherein said control causes images to be displayed on said display in a pattern and wherein said pattern includes groupings of images that are indicative of information that is related.

11. A method of displaying images indicative of information on a display screen within a vehicle, comprising the steps of:

(A) assigning a priority level to each of a plurality of images to be displayed, said priority levels including a first level for necessary images that are always displayed and various secondary levels that are of lower priority than said first level for optional images;

(B) determining which of said images are to be included in a desired display;

(C) comparing a space required by said desired display with an available display space;

(D) defining a condition wherein the space required by the desired display can be accommodated within the available display space;

(E) changing the desired display by performing one or more of the following substeps until the condition of step (D) exists
  1) rearranging the images to be included in the desired display by changing a placement of each image,
  2) changing the configuration of some of the images to be included in the desired display beginning with images having the lowest priority levels,
  3) reducing the space required by some of the images to be included in the desired display beginning with images having the lowest priority levels, and
  4) if the condition of step (D) does not exist after performing substeps 1, 2 and 3, changing the size or configuration of at least one of the images from a user-preferred size or configuration; and (F) displaying the desired display once the condition from step (D) exists.

12. The method of claim 11, wherein substep 4 of step (E) further includes changing the content of the desired display by deleting at least one of the images beginning with the remaining image having the lowest priority.

* * * * *